United States Patent

[11] 3,633,450

[72] Inventor James E. Grote
 998 Thurman Ave., Columbus, Ohio 43206
[21] Appl. No. 35,726
[22] Filed May 8, 1970
[45] Patented Jan. 11, 1972

[54] MACHINE FOR SLICING SAUSAGE AND APPLYING THE SLICES TO PIZZA IN A PREDETERMINED PATTERN
 10 Claims, 9 Drawing Figs.
[52] U.S. Cl. .................................................. 83/201, 146/62, 146/168
[51] Int. Cl. ...................................................... B26d 1/46
[50] Field of Search .......................................... 83/201; 146/60, 61, 62, 151, 168, 129

[56] References Cited
 UNITED STATES PATENTS
 1,991,033 2/1935 Steinwand .................. 146/168 X
 2,605,799 8/1952 Ratti ........................... 146/168 X
 FOREIGN PATENTS
 12,152 1904 Great Britain ................ 146/62

Primary Examiner—Willie G. Abercrombie
Attorney—Mahoney, Miller & Stebens

ABSTRACT: A machine which receives and holds a group of sausage sticks over a pizza with their axes vertical and substantially perpendicular to the pizza and with their lower ends spaced above the pizza. The group of sausage sticks is moved laterally relative to a band-type cutting blade and the pizza is simultaneously moved therewith so that as the sausage slices are severed from the lower ends of the sticks, they drop in a predetermined pattern on the pizza.

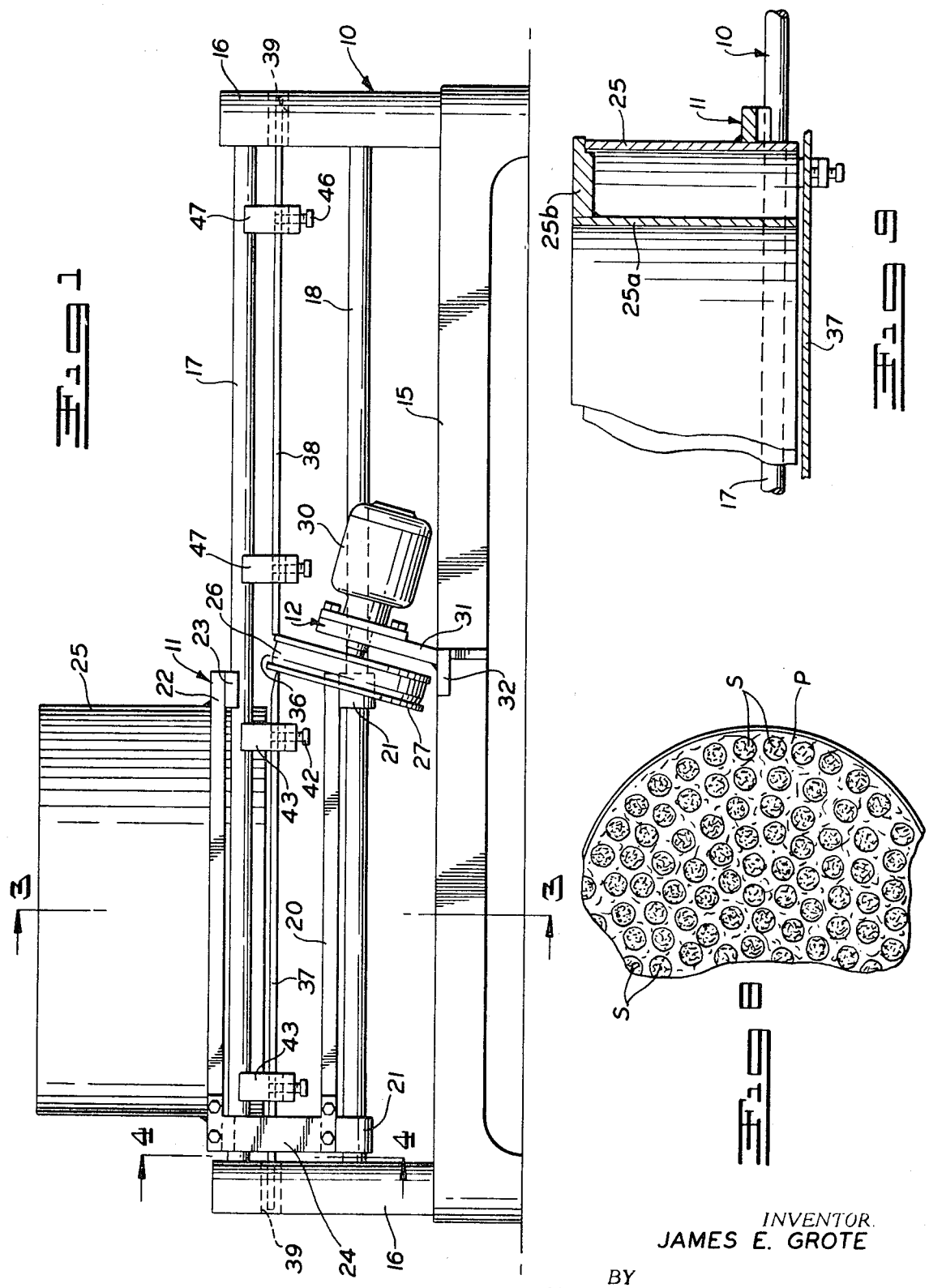

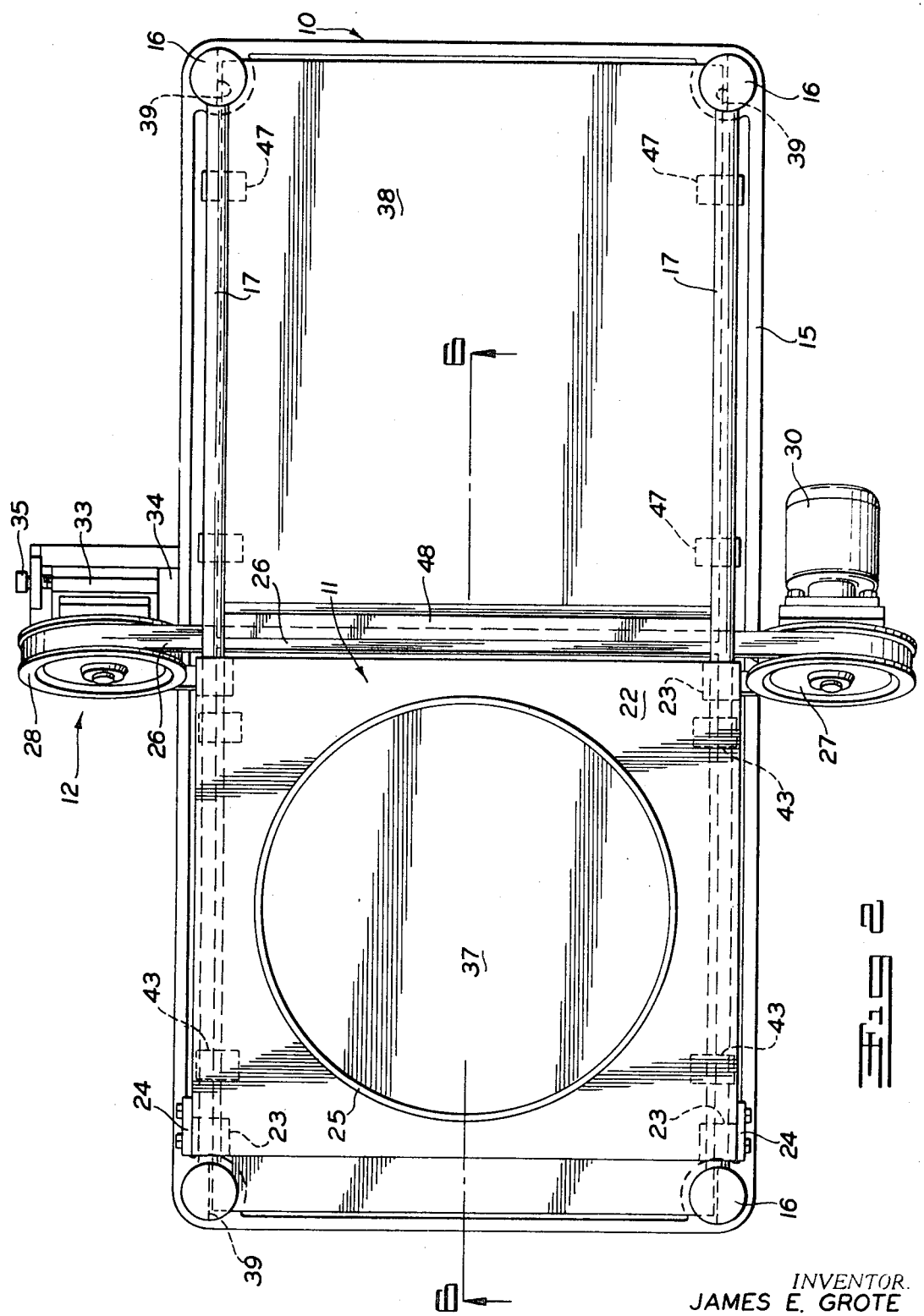

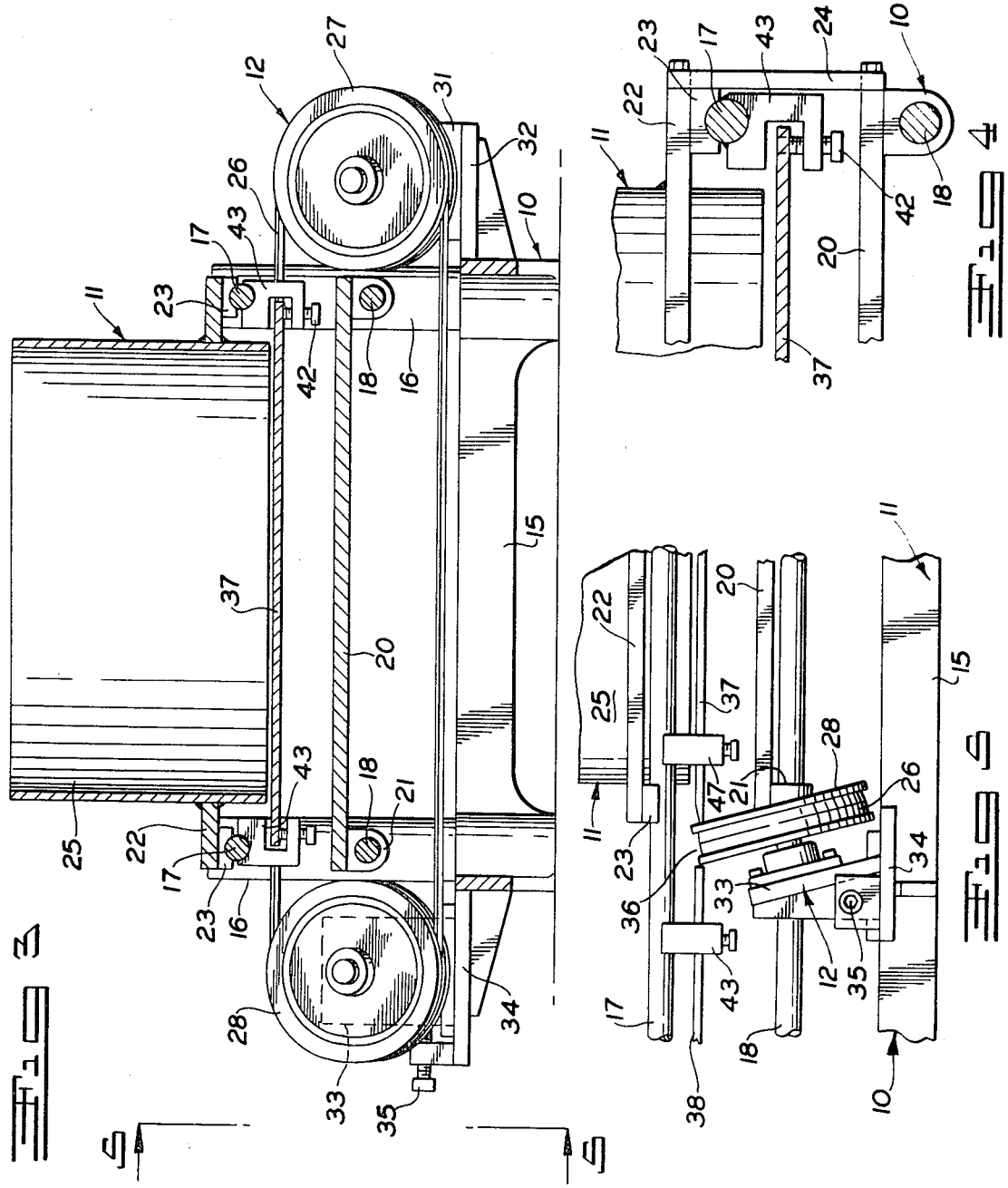

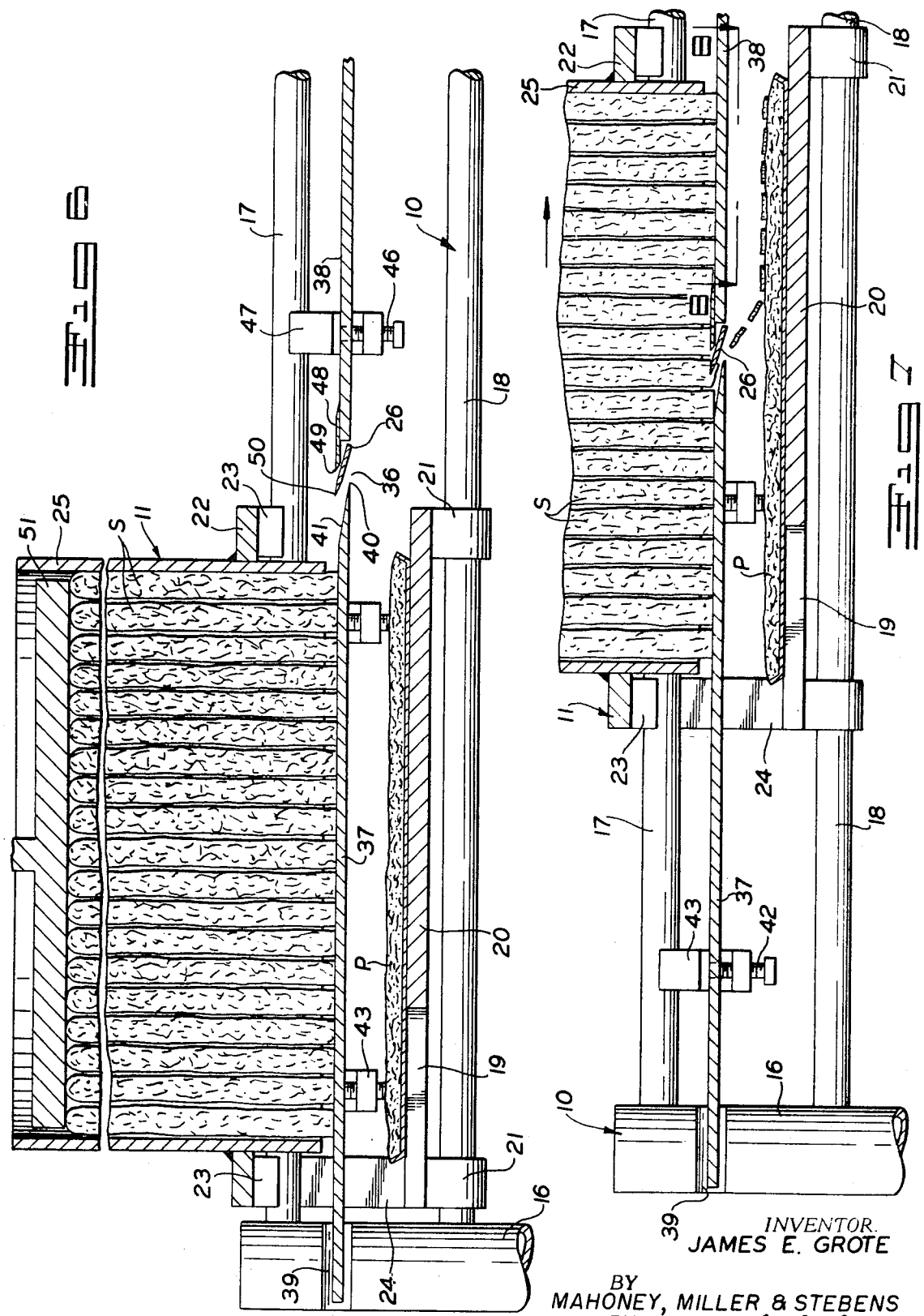

MACHINE FOR SLICING SAUSAGE AND APPLYING THE SLICES TO PIZZA IN A PREDETERMINED PATTERN

There have been many types of sausage-slicing machines used in the past in connection with the application of sausage slices, such as pepperoni slices, to the pizza before baking, and some of these machines have been very effective in producing the slices. However, it has then been necessary to handle the slices individually and apply them in a proper pattern on the pizza. This is not only time-consuming, but often results in a nonuniform application of the slices to the pizza. Furthermore, considerable wastage results from dropping slices during handling and from applying the slices to the pizza in multiple layers.

The present invention provides a machine which will receive a group of the sausage sticks in a pattern corresponding to that to be produced on the pizza, will hold them with their axes substantially vertical and with their lower ends exposed for cutting and arranged above the pizza, which is received and supported by the machine, and will move the exposed ends into association with a band-type cutting blade and simultaneously move the pizza, while maintaining its original relationship to the sticks, so that the severed slices will drop in the predetermined pattern onto the pizza. The machine can receive sausage sticks of any diameter and length and will automatically feed them into cutting position and automatically drop the slices in proper positions on the pizza without wastage.

The best mode contemplated for carrying out my invention is illustrated in the accompanying drawings in which:

FIG. 1 is a side elevational view of my sausage slicing and applying machine.

FIG. 2 is a plan view of the machine.

FIG. 3 is a transverse vertical sectional view through the machine taken along line 3—3 of FIG. 1.

FIG. 4 is a detail in transverse vertical section taken along line 4—4 of FIG. 1.

FIG. 5 is a side elevational view of a portion of the machine taken along line 5—5 of FIG. 3.

FIG. 6 is an enlarged vertical sectional view through the machine taken along line 6—6 of FIG. 2.

FIG. 7 is a view similar to FIG. 6, but showing parts in an advanced position during the cutting and application of the sausage to the pizza.

FIG. 8 is a view taken from the position indicated at line 8—8 of FIG. 7, showing sausage in place in the pizza.

FIG. 9 is a vertical sectional view illustrating the means for adapting the machine to smaller pizzas.

With particular reference to the drawings, the machine of my invention is illustrated as comprising mainly a carriage guide and support unit 10, a carriage 11 reciprocably mounted on the unit 10, and a band-type power-driven knife unit 12, as shown best in FIGS. 1, 2 and 3.

The unit 10 may take various forms, but is illustrated as comprising a rectangular base 15 having the four upstanding support posts 16 at its respective corners. These posts carry a pair of longitudinally extending upper guide rails 17 and a pair of longitudinally extending lower guide rails 18, the rails of each pair being in spaced parallel relationship and the upper and lower rails being in respective horizontal planes which are vertically spaced.

The carriage 11 is mounted on the rails 17 and 18 for manual reciprocation longitudinally thereof. The carriage comprises a lower pizza support plate 20 which has bearing sleeves 21 attached to its lower surface and slidably fitted on the guide rails 18 so that this plate can reciprocate above the rails 18. The carriage also includes a sausage hopper support plate 22 disposed above the guide rails 17 and having bearing yokes 23 secured to its under surface for slidably engaging the upper sides of the rails 17. At what may be termed the rear or trailing end of the carriage 11, a pair of vertical brackets 24 (FIGS. 2 and 4) are provided for rigidly connecting together the lower carriage plate 20 and the upper carriage plate 22. The plate 22 supports the upright sausage-receiving hopper 25, which is of circular outline, and has a circular opening corresponding thereto, and downwardly through which the hopper projects, the hopper being welded or otherwise secured in this opening (FIG. 6). Thus, the hopper 25 is open at both its upper and lower ends and it will be noted that this axis is centered relative to the plate 20, which is substantially square, and is substantially perpendicular thereto. The plate 20 is provided with a large notch or cut out 19 at its rear edge (FIG. 6) to facilitate positioning of the pizza P thereon when the carriage is moved to its rearwardmost position as determined by contact of the rear carriage brackets 24 with the fixed rear support posts 16.

The cutting unit 12 comprises the endless cutting blade or band 26 which passes around the grooved driver pulley 27 at one side of the support unit 10 and the grooved idler pulley 28 at the opposite side thereof. The respective pulleys are located substantially midway of the length of the support unit 10 and are located outwardly of the respective guide rails 17 and 18, being in a common plane transversely of the support so that the blade or band 26 will travel transversely of the support. As indicated in FIG. 2, when the carriage 11 is at its rearwardmost position, the forward or leading edge of its plate 22 will be behind the upper run of the band 26. It will be noted that the axes of the pulleys 27 and 28 are tilted relative to the horizontal so that the upper run of the band 26 tilts forwardly and downwardly. The pulley 27 is carried by the tilted drive shaft of an electric motor 30 (FIGS. 1, 2 and 3) which is bolted to a tilted bracket 31 that is welded or otherwise secured to the support 32 extending laterally outwardly from the base 15. The pulley 28 at the opposite side is carried by a tilted shaft mounted on a tilted bracket 33 (FIG. 5) that is carried by the opposite outwardly extending support 34 on the base 15. The bracket 33 is mounted on the support 34 for in-and-out adjustment by means of the screw 35 so that the tension of band 26 can be adjusted.

The upper run of the band 26 is disposed in a transverse slot 36, as shown in FIGS. 1, 2 and 6 and 7, which is provided between the forward edge of a rearward plate 37 and the rear edge of a forward plate 38 which are disposed substantially in a common horizontal plane directly below the upper guide rails 17. The rear end of the plate 37 is disposed in slots 39 in the two rear posts 16 to permit vertical adjustment, whereas its front end projects beyond the forward or leading edges of the plates 21 and 22 of the carriage, when the carriage is in its rearwardmost position, as indicated in FIG. 6. It will be noted that the plate 37 is at a level slightly below the lower edge of the hopper 25. It will also be noted that the forward edge of the plate 37 is in the form of a sharp knife edge 40 with an associated upwardly and rearwardly bevelled surface 41. The plate 37 can be adjusted vertically by means of adjusting screws 42 carried by brackets 43. The brackets 43 are welded to the rails 17 and the screws 42 engage the lower surface of the plate, a pair of these screws being adjacent the forward edge 40 and another pair being spaced forwardly of the rear posts 16. Thus the plate can be accurately adjusted vertically by adjusting the screws 42 to properly locate it for producing various thicknesses of sausage slices.

The plate 38 is mounted in a manner similar to the plate 37 with its forward edge located in slots 39 in the forward posts 16 and being adjustable by means of the screws 46 on brackets 47 carried by the upper rails 17. The plate 38 at its rear lower edge carries a knife edge strip 48 which extends rearwardly over the band 26 and which is in a horizontal plane slightly above that of the upper surfaces of the plates 37 and 38, but which has a sharp rear edge 49 at the same level as the sharp rear edge 50 of the cutting blade or band 26. It will be noted (FIGS. 6 and 7) that the tilted blade 26 is wider than the slot 26, has its forward lower edge under the strip 48 and its upper rear edge 50 above the bevelled surface 41 of the plate 37.

The hopper 25 will receive the sausage sticks S and they will be packed therein to just fill the area of the hopper. Their lengths and diameters can vary within limits and they will be in a predetermined circular pattern over the circular pizza P which will be supported on the plate 20. The hopper will be of a diameter slightly less than that of the pizza. If desired, shallow dividing partitions (not shown) may be provided adjacent the lower end of the hopper to separate the sausage sticks into smaller groups. A disc-type weight 51 will be disposed in the hopper above the sticks S so as to keep their lower projecting ends in contact with the plate 37 in the initial position of the carriage 11. It will be noted that the ends of the sticks will extend below the lower edge of the hopper 25.

If it is desired to use the machine for smaller pizza, the hopper 25 may be made of smaller diameter as indicated in FIG. 9. This will be accomplished by inserting a smaller diameter adapter 25a into the hopper which will have an upper peripheral support flange 25b engage the upper edge of the hopper 25.

In the operation of the machine, the hopper 25 is filled with the sausage sticks S such as pepperoni and the weight 51 is positioned therein so that the lower ends of the sticks will engage the plate 37, the carriage 11 being in its initial or rearward position at this time. The sticks will not be packed too tightly so that they will tend to drop by gravity through the housing. However, they will be close together to cover the whole area of the hopper and thus be in a proper circular cross-sectional pattern to cover the pizza P which will be centered on the support 20 relative to the hopper 25. The motor 30 will be engaged to drive the cutting band 26.

Now, if the carriage 11 is advanced or moved to the right, as shown by a comparison of FIGS. 6 and 7, the slices of pepperoni will be cut from the lower ends of the sticks S and will be simultaneously dropped onto the pizza in the same relationship the sticks were positioned while in the hopper relative to the underlying pizza P. As the carriage advances, the pepperoni sticks will be successively engaged by the cutting edge 50 of the travelling band 26. Due to the tilt of the blade 26, the slices will be forced downwardly, as indicated in FIG. 7, and will drop onto the underlying pizza. Thus, the slices will be applied on the pizza in the same pattern as the cross-sectional arrangement of the sticks in the hopper 25. Movement in the one direction of the carriage will sever the ends of all the sticks and as they move past the blade 26, they will be supported by the plate 38. Movement of the carriage back to its original position to the left, will cause the lower ends of the sticks S to successively travel over the strip 48, the blade 26, and the surface 41 to the upper surface of the plate 37 to again be supported thereby. The diameters of the sticks S can vary, but in all cases the diameter must be less than the width of the slot 36 so that they will pass downwardly therethrough. The lengths can also vary since all of the sticks will have their lower ends resting on the plate 37 in the initial position of the carriage.

Having thus described my invention, what I claim is:

1. A machine for slicing and applying sausage or the like to pizza or the like comprising:
   supply means for receiving the sausage in the form of sticks and supporting them with their ends exposed;
   a support on which the pizza is supported in a plane spaced from the supply means and from the lower ends of the sticks therein;
   a cutting means located adjacent one side of the supply means; and
   means for moving the sausage sticks supply means and the support simultaneously so as to move the exposed ends of the sticks into cooperation with the cutting means which cuts slices therefrom and applies them to the pizza on said support.

2. A machine according to claim 1, including:
   a carriage reciprocably mounted on a base;
   said carriage being provided with the supply means in the form of an upright hopper for receiving the sticks with their axes substantially vertical and projecting from the lower end of the hopper; said carriage also being provided with the support means in the form of a substantially horizontal plate spaced below the hopper, a support and guide unit in which said carriage is reciprocably mounted; said cutting means being carried adjacent one side of said hopper so that the carriage when moved in one direction of its reciprocation will move into association therewith.

3. A machine according to claim 2 in which the cutting means comprises a cutting band movable across said support and guide unit in a transverse direction and having a cutting edge which extends toward the carriage when it is in its initial position.

4. A machine according to claim 3 in which a first sausage stick support plate is carried on said support and guide unit and is disposed in a substantially horizontal plane beneath said hopper and above said pizza support plate for engaging the lower ends of the sausage sticks when the carriage is in its initial position so as to support the sticks, said support plate supporting the pizza at a lower level which is below the level of said cutting band, a second plate carried on said support and guide unit ahead of said first plate in the direction of movement of the carriage from its initial position and in substantially a common horizontal plane therewith, said second plate being spaced ahead of the first plate to provide a transverse slot in which said cutting band travels.

5. A machine according to claim 4 in which the band is tilted forwardly and downwardly in the direction of travel of the carriage with a rear cutting edge above the forward or leading edge of said first plate.

6. A machine according to claim 5 in which the rear cutting edge of the band is disposed over a downwardly inclined bevelled surface on the forward leading edge of said first plate.

7. A machine according to claim 6 in which the adjacent edges of said first and second plates are vertically adjustable to accurately position them relative to said cutting band.

8. A machine according to claim 7 in which said band is in the form of an endless band carried by pulleys at opposite sides of said support and guide unit, said pulleys having their axis tilted to support the band in tilted position, said band having its upper run travelling in said slot.

9. A machine according to claim 8 in which said pulleys are supported by relatively adjustable supports on said unit to permit adjustment of the tension on said band.

10. A machine according to claim 9 in which the hopper is provided with a weight for engaging the sticks and forcing them by gravity downwardly through the hopper.

* * * * *